Aug. 22, 1950

T. S. GORTON, JR 2,519,960

FROZEN FOOD PACKAGE

Filed Oct. 11, 1948

INVENTOR
THOMAS SLADE GORTON, JR,
BY *Chapin & Neal*
ATTORNEYS

Patented Aug. 22, 1950

2,519,960

UNITED STATES PATENT OFFICE 2,519,960

FROZEN FOOD PACKAGE

Thomas Slade Gorton, Jr., Chicago, Ill.

Application October 11, 1948, Serial No. 53,780

1 Claim. (Cl. 62—1)

This invention relates generally to the packaging art and particularly to a frozen food package.

In the prior art the common practice has been to put freezable foods in wax impregnated or coated boxes and subject the package to quick freezing temperatures. The frozen food package is then kept under refrigeration until its ultimate preparation for use. If the food is allowed to thaw in handling prior to such use and then refrozen, much of the value of the original quick freeze is lost. Some foods are toughened by refreezing and most suffer a considerable loss of flavor. The food may also be contaminated if allowed to remain unfrozen for any appreciable length of time. With such a prior art package, however, it is not possible for the consumer to tell whether such thawing and refreezing has been allowed to take place. The discovery often comes too late. The consumer is disappointed in the product and blames the food processor whose brand name appears on the package though the latter has taken every precaution to issue a good product.

The principal purpose of the present invention is to provide a frozen food container which will readily show the purchaser whether the food has remained frozen since its initial quick freezing. The new package is the "consumer guarantee" for a continuously frozen condition from processor to user.

Another purpose is to provide a new container which will cheaply afford visual inspection of its contents by a prospective purchaser.

Still another purpose is to provide a new container novel and attractive in appearance and which allows for ready quality inspection by all handling the goods in the regular channels of trade.

Other purposes will appear in the following description and be further pointed out in the appended claim.

Figure 1:
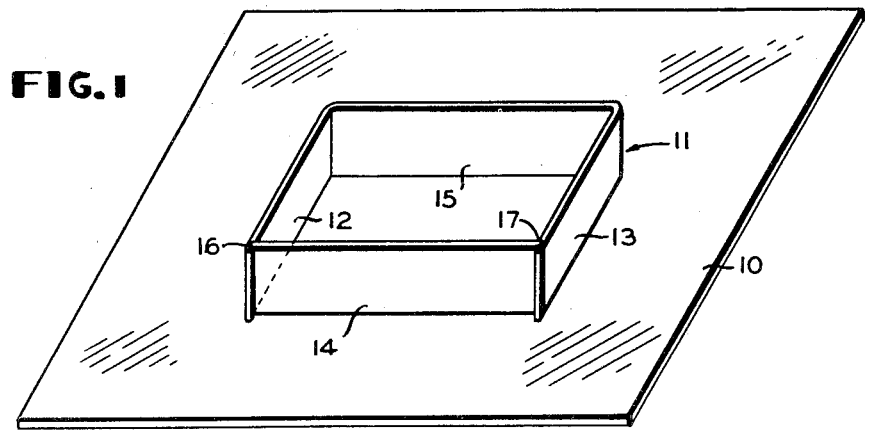
Fig. 1 is a perspective view in orthographic projection of the new container ready to be filled and wrapped.
Figure 2:
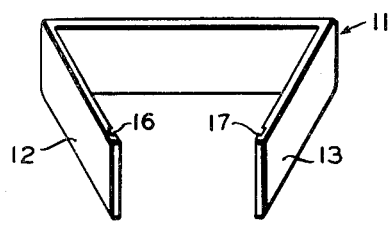
Fig. 2 is a pictorial view of the principal structure of the container shown in Fig. 1 as it appears before the non-integral fourth wall is inserted.
Figure 3:
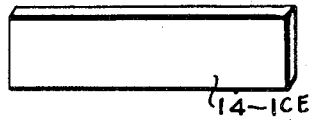
Fig. 3 is a perspective view of the fourth wall element for the structure of Fig. 2.
Figure 5:
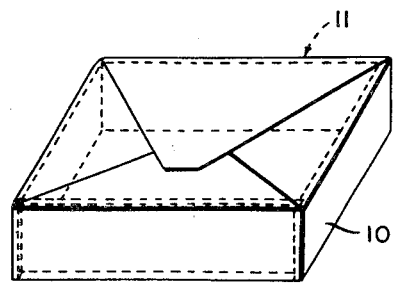
Fig. 5 is a perspective view of Fig. 1 after the container is wrapped.

Referring to the drawings, a sheet of wrapping paper 10 of the type commonly used in the art and preferably of transparent character as indicated is shown in Fig. 1 cut to the appropriate wrapping size. On this sheet flatly rests a three sided resilient plastic box structure 11 (illustrated in Fig. 2) with its flexible sides 12 and 13 held apart by a fourth side member 14 made of ice. Side member 14 is a thin ice sheet preferably of the same thickness and linear dimensions as sides 12 and 13 and 15 of plastic element 11. Member 14 is also preferably made of clear ice. To insert the ice sheet member 14, the resilient plastic flexible sides 12 and 13 are forced apart and the ends of the ice sheet 14 inserted in grooves or notches 16 and 17. When so inserted a rigid box with square corners is formed open on both top and bottom. With wrapping sheet 10 serving as the bottom, the box structure is then filled with the freezable food and the sheet 10 folded or wrapped around the sides and over the top where it is secured by cementing, stapling, or other well known ways of sealing a package. The sealed package is then quick frozen in the usual manner and distributed as any other frozen food package.

The distinctive feature of such a container is that once thawing is allowed to take place the ice sheet 14 melts and deforms the package. The spring-like side members 12 and 13 of the plastic box structure tending to move toward the position generally shown in Fig. 2 also deform the shape. No amount of refreezing or thawing will return the container back to the original rectangular shape. The consumer need only examine the shape of the package to see that its contents have once thawed. Also if wrapping sheet 10 is made of transparent character, a visual inspection will indicate whether the ice sheet 14 has melted and whether the food has been refrozen.

While the principal distinctive feature of the new container is in warning the purchaser that the frozen food has thawed and been refrozen before his purchasing it, the appearance of the package is also attractive and useful in other ways.

For example, when the box structure 11 is made of clear transparent plastic, the sheet 14 of clear ice, and the wrapping sheet 10 of transparent material, visual inspection of the contents of the package is possible from any and all viewing angles.

In the new package there is also the advantage of convenient access to the frozen food. The wrapping sheet 10 is easily unwrapped, the ice sheet or wall 14 easily broken, melted or freed by moving the plastic side members 12 and 13 outward, and the plastic box structure simply removed, leaving the frozen food resting on a waterproof sheet to thaw for immediate preparation and use.

Under mass production, the cost of the new container is substantially the same or even cheaper than the conventional impregnated or waxed paper box now commonly used or the metal containers sometimes employed.

Figure 4:
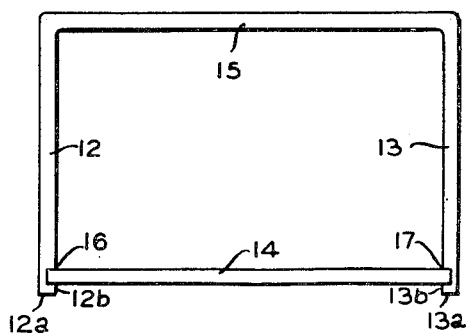
Fig. 4 is a plan view indicating the element of Fig. 3 inserted as a fourth wall in the structure of Fig. 2.

Although many types of joints may be used to fasten the ice sheet 14 to the plastic side members 12 and 13, a convenient arrangement is shown in Fig. 4 where sheet 14 is held in grooves slightly behind end portions 12a and 13a. This arrangement provides the convenient surfaces 12b and 13b for the user's thumbs in prying the plastic sides 12 and 13 apart and breaking the ice free.

Having fully disclosed my invention, I claim:

A container for frozen foods comprising an integral wall structure of resilient plastic material having two oppositely facing walls and a connecting wall therebetween to form a three sided element, each inner end of said facing walls in normal condition being joined to said connecting wall at an angle of less than 90°, a sheet of ice between the free ends of the facing walls forcing the latter into substantially parallel relation to form a rectangular box-like container construction with one wall thereof being perishable, and a moistureproof flexible wrapper completely enclosing said container construction whereby on thawing of said ice wall the oppositely facing walls act to converge towards the free ends thereof and deform the container from its rectangular shape.

THOMAS SLADE GORTON, Jr.

REFERENCES CITED

The following references are of record in the file of this patent:

UNITED STATES PATENTS

| Number | Name | Date |
|---|---|---|
| 2,200,867 | Weltmer | May 14, 1940 |
| 2,340,337 | McNaught | Feb. 1, 1944 |